United States Patent
Seo et al.

(10) Patent No.: US 11,082,979 B2
(45) Date of Patent: *Aug. 3, 2021

(54) METHOD FOR TRANSMITTING AND RECEIVING SIGNAL FOR DEVICE-TO-DEVICE COMMUNICATION IN WIRELESS COMMUNICATION SYSTEM AND APPARATUS FOR SAME

(71) Applicant: LG ELECTRONICS INC., Seoul (KR)

(72) Inventors: Hanbyul Seo, Seoul (KR); Kijun Kim, Seoul (KR); Sunghoon Jung, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

This patent is subject to a terminal disclaimer.

(21) Appl. No.: 16/510,729

(22) Filed: Jul. 12, 2019

(65) Prior Publication Data
US 2019/0342892 A1    Nov. 7, 2019

Related U.S. Application Data

(63) Continuation of application No. 15/307,761, filed as application No. PCT/KR2015/004414 on Apr. 30, 2015, now Pat. No. 10,390,345.

(Continued)

(51) Int. Cl.
*H04W 72/04* (2009.01)
*H04W 76/14* (2018.01)
(Continued)

(52) U.S. Cl.
CPC ....... *H04W 72/0453* (2013.01); *H04W 72/04* (2013.01); *H04W 72/12* (2013.01);
(Continued)

(58) Field of Classification Search
CPC ..... H04W 76/10; H04W 76/14; H04W 76/15; H04W 72/02; H04W 72/04;
(Continued)

(56) References Cited

U.S. PATENT DOCUMENTS

2011/0228666 A1   9/2011   Barbieri et al.
2011/0255450 A1   10/2011  Wang et al.
(Continued)

FOREIGN PATENT DOCUMENTS

CN    103068049    4/2013
CN    106165509    11/2016
(Continued)

OTHER PUBLICATIONS

State Intellectual Property Office of the People's Republic of China Application Serial No. 201580022964.9, Office Action dated Nov. 20, 2018, 20 pages.

(Continued)

*Primary Examiner* — Peter Chen
(74) *Attorney, Agent, or Firm* — Lee, Hong, Degerman, Kang & Waimey

(57) ABSTRACT

The present invention provides a method for transmitting and receiving a signal for device-to-device (D2D) communication and apparatus for the same, which are used in a wireless access system supporting D2D communication. As one aspect of the present invention, a method for transmitting and receiving a D2D signal by a terminal comprises the steps of: determining whether a D2D signal can be transmitted and received in at least one frequency band; transmitting, to a base station, information on a frequency band capacity; and generating the D2D signal according to the information on a frequency band capacity.

16 Claims, 13 Drawing Sheets

Related U.S. Application Data

(60) Provisional application No. 61/986,843, filed on Apr. 30, 2014.

(51) Int. Cl.
*H04W 72/12* (2009.01)
*H04L 1/16* (2006.01)

(52) U.S. Cl.
CPC .......... *H04W 76/14* (2018.02); *H04L 1/1607* (2013.01); *H04W 72/0413* (2013.01)

(58) Field of Classification Search
CPC ......... H04W 72/0406; H04W 72/0413; H04W 72/042; H04W 72/044; H04W 72/0446; H04W 72/0453; H04W 72/048; H04W 72/12; H04W 72/1205; H04W 72/1278; H04W 4/70; H04W 92/18; H04L 5/0048; H04L 5/0053; H04L 1/1607
See application file for complete search history.

(56) References Cited

U.S. PATENT DOCUMENTS

| | | | |
|---|---|---|---|
| 2013/0308490 A1* | 11/2013 | Lim | H04W 4/70 370/252 |
| 2013/0322370 A1 | 12/2013 | Fong et al. | |
| 2014/0056220 A1 | 2/2014 | Poitau et al. | |
| 2014/0185530 A1 | 7/2014 | Kuchibhotla et al. | |
| 2014/0247802 A1 | 9/2014 | Wijting et al. | |
| 2015/0085765 A1 | 3/2015 | Tavildar et al. | |
| 2015/0148030 A1 | 5/2015 | Seo | |
| 2015/0230258 A1 | 8/2015 | Kwon et al. | |
| 2017/0013640 A1 | 1/2017 | Loehr et al. | |
| 2017/0055264 A1 | 2/2017 | Seo et al. | |

FOREIGN PATENT DOCUMENTS

| | | |
|---|---|---|
| EP | 3125626 | 2/2017 |
| EP | 3139522 | 3/2017 |
| EP | 3139687 | 3/2017 |
| WO | 2013068788 | 5/2013 |
| WO | 2013088398 | 6/2013 |
| WO | 2013109100 | 6/2013 |
| WO | 2013120267 | 8/2013 |
| WO | 2013162345 | 10/2013 |
| WO | 2013171115 | 11/2013 |
| WO | 2014003358 | 1/2014 |
| WO | 2015167287 | 11/2015 |

OTHER PUBLICATIONS

United States Patent and Trademark Office U.S. Appl. No. 15/307,761, Office Action dated Dec. 6, 2018, 18 pages.
United States Patent and Trademark Office U.S. Appl. No. 15/307,761, Final Office Action dated Aug. 3, 2018, 16 pages.
United States Patent and Trademark Office U.S. Appl. No. 15/307,761, Office Action dated Mar. 8, 2018, 20 pages.
European Patent Office Application Serial No. 15786806.8, Search Report dated Nov. 8, 2017, 13 pages.
LG Electronics, "Issues in Signal Transmissions and Receptions in D2D Operations", 3GPP TSG RAN WG1 Meeting #74, R1-133389, XP050716503, Aug. 2013, 6 pages.
PCT International Application No. PCT/KR2015/004414, Written Opinion of the International Searching Authority dated Aug. 19, 2015, 19 pages.
Ericsson et al., "WF on D2D Multicarrier UE capabilities Assumptions", R1-141752, 3GPP TSG RAN WG1 Meeting #76bis, Apr. 3, 2014, 3 pages.

* cited by examiner

FIG. 2
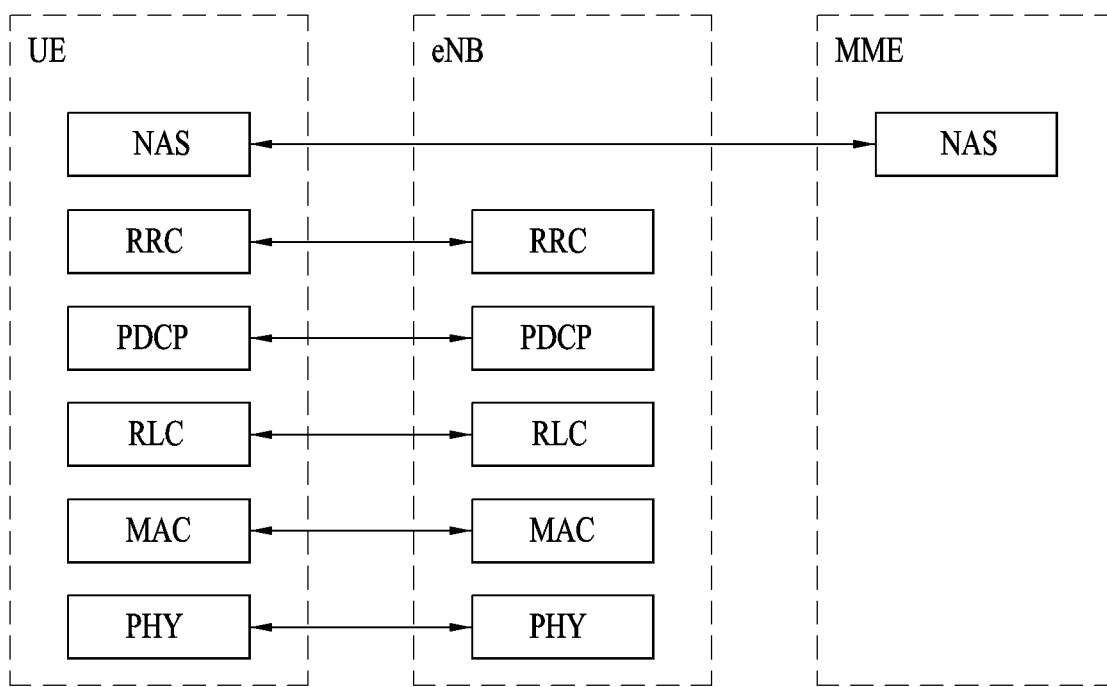
(a) Control-plane protocol stack
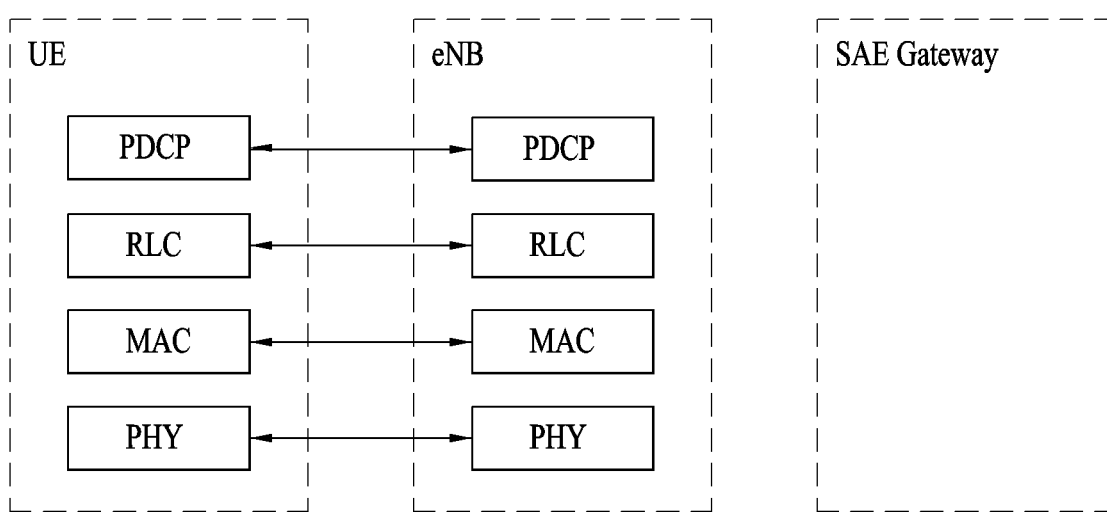
(b) User-plane protocol stack

METHOD FOR TRANSMITTING AND RECEIVING SIGNAL FOR DEVICE-TO-DEVICE COMMUNICATION IN WIRELESS COMMUNICATION SYSTEM AND APPARATUS FOR SAME

CROSS-REFERENCE TO RELATED APPLICATIONS

This application is a continuation of U.S. patent application Ser. No. 15/307,761, filed on Oct. 28, 2016, now U.S. Pat. No. 10,390,345, which is the National Stage filing under 35 U.S.C. 371 of International Application No. PCT/KR2015/004414, filed on Apr. 30, 2015, which claims the benefit of U.S. Provisional Application No. 61/986,843, filed on Apr. 30, 2014, the contents of which are all hereby incorporated by reference herein in their entirety.

TECHNICAL FIELD

The present invention relates to a wireless communication system, and more particularly, to a method of transceiving a signal for a device-to-device (D2D) communication in a wireless communication system and apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

Based on the above-mentioned discussions, the technical task of the present invention is to provide a method of transceiving a signal for a device-to-device (D2D) communication in a carrier aggregation supportive wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

The present invention provides a method of transceiving a signal for a device-to-device (D2D) communication in a wireless communication system and apparatus therefor.

In one technical aspect of the present invention, provided herein is a signal transmitting and receiving method in transmitting and receiving a Device-to-Device (D2D) signal by a user equipment in a wireless communication system supportive of carrier aggregation, including determining whether the D2D signal can be transmitted and received on at least one frequency band, transmitting information on frequency bad capability to a base station, and generating the D2D signal according to the information on the frequency band capability, wherein whether the D2D signal can be transmitted and received can be determined based on whether the carrier aggregation applies to the at least one frequency band.

In another technical aspect of the present invention, provided herein is a signal transmitting and receiving method in transmitting and receiving a signal for a Device-to-Device (D2D) communication by a base station in a wireless communication system supportive of carrier aggregation, including receiving information on frequency band capability from a user equipment, determining whether the user equipment can transmit and receive a D2D signal on at least one frequency band based on the information on the frequency band capability, and scheduling the D2D signal for a specific frequency band in the at least one frequency band.

In another technical aspect of the present invention, provided herein is a user equipment in transmitting and receiving a Device-to-Device (D2D) signal in a wireless communication system supportive of carrier aggregation, including a transceiver module configured to transmit and receive a signal and a processor configured to determine whether the D2D signal can be transmitted and received on at least one frequency band, transmit information on frequency bad capability to a base station, and generate the D2D signal according to the information on the frequency band capability, wherein whether the D2D signal can be transmitted and received can be determined based on whether the carrier aggregation applies to the at least one frequency band.

In another technical aspect of the present invention, provided herein is a base station in transmitting and receiving a signal for a Device-to-Device (D2D) communication in a wireless communication system supportive of carrier aggregation, including a transceiver module configured to receive information on frequency band capability from a user equipment and a processor configured to determine whether the user equipment can transmit and receive a D2D signal on at least one frequency band based on the information on the frequency band capability and schedule the D2D signal for a specific frequency band in the at least one frequency band.

The following matters may be included in the above technical aspects of the present invention in common.

The information on the frequency band capability may include information indicating a carrier aggregation supported frequency band.

Preferably, an uplink carrier aggregation supported frequency band in the carrier aggregation supported frequency band may include a frequency band capable of transmitting and receiving the D2D signal. Or, an uplink carrier aggregation and downlink carrier aggregation supported frequency band in the carrier aggregation supported frequency band may include a frequency band capable of transmitting and receiving the D2D signal.

The information on the frequency band may include information on an operating mode of transmitting and receiving the D2D signal and the operating mode may include at least one of a first operating mode indicating that the D2D signal on a first frequency band and a signal on a second frequency band are simultaneously transmitted and a second operating mode indicating that the D2D signal on the first frequency band and the signal on the second frequency band are transmitted in different times, respectively.

If the first frequency band and the second frequency band are equal to each other, the information on the frequency band may apply according to the second operating mode.

It is to be understood that both the foregoing general description and the following detailed description of the present invention are exemplary and explanatory and are intended to provide further explanation of the invention as claimed.

Advantageous Effect

According to the present invention, a D2D (device-to-device) signal can be efficiently transceived in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 shows structures of control and user planes of a radio interface protocol between a user equipment and an E-UTRAN based on 3GPP radio access network specification.

BEST MODE FOR INVENTION

Figure 1:
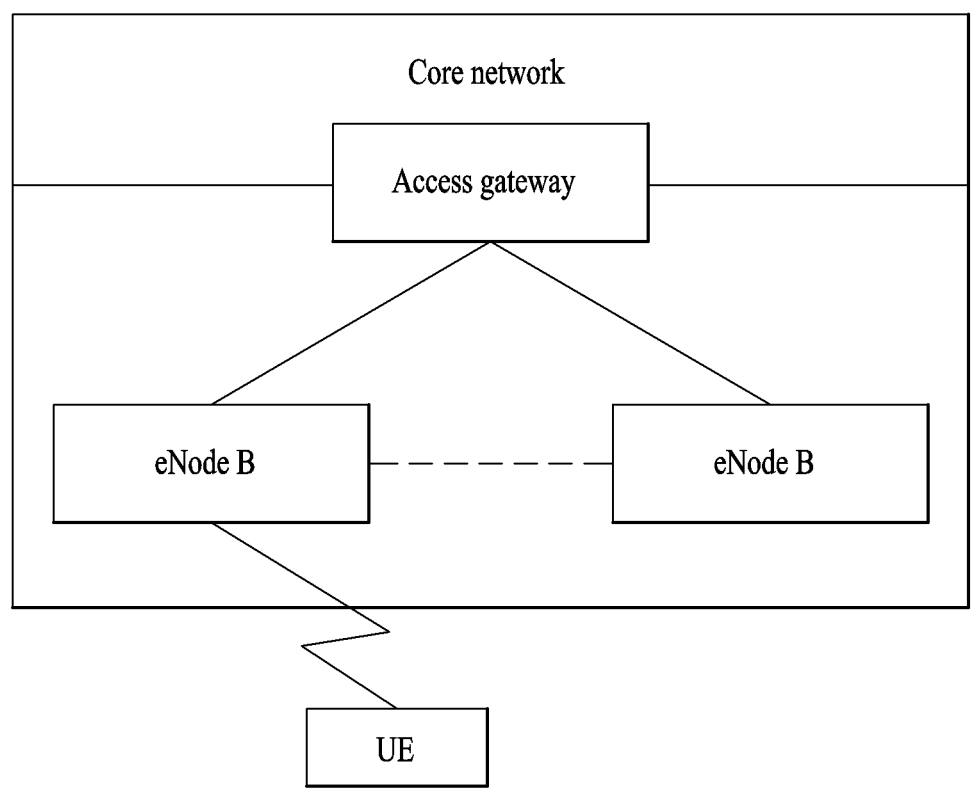
FIG. 1 shows an E-UMTS network structure as one example of a wireless communication system.

The following embodiments of the present invention can be applied to a variety of wireless access technologies, for example, CDMA (Code Division Multiple Access), OFDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System).

For clarity, the following description focuses on the 3GPP LTE and 3GPP LTE-A system. However, technical features of the present invention are not limited thereto.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
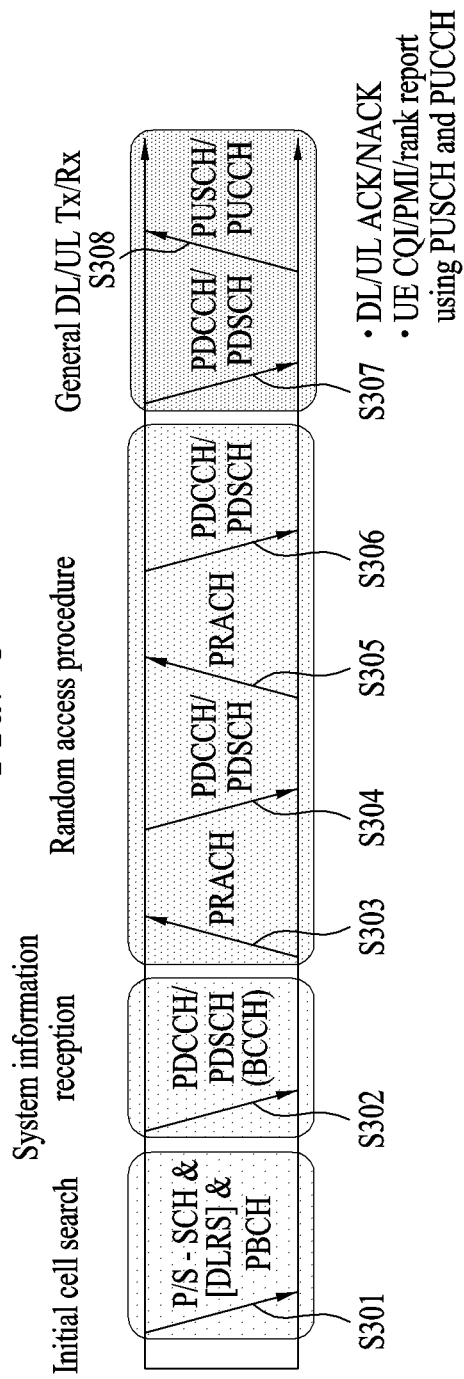
FIG. 3 shows physical channels used for a 3GPP LTE system and a general method of transmitting a signal using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose. Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
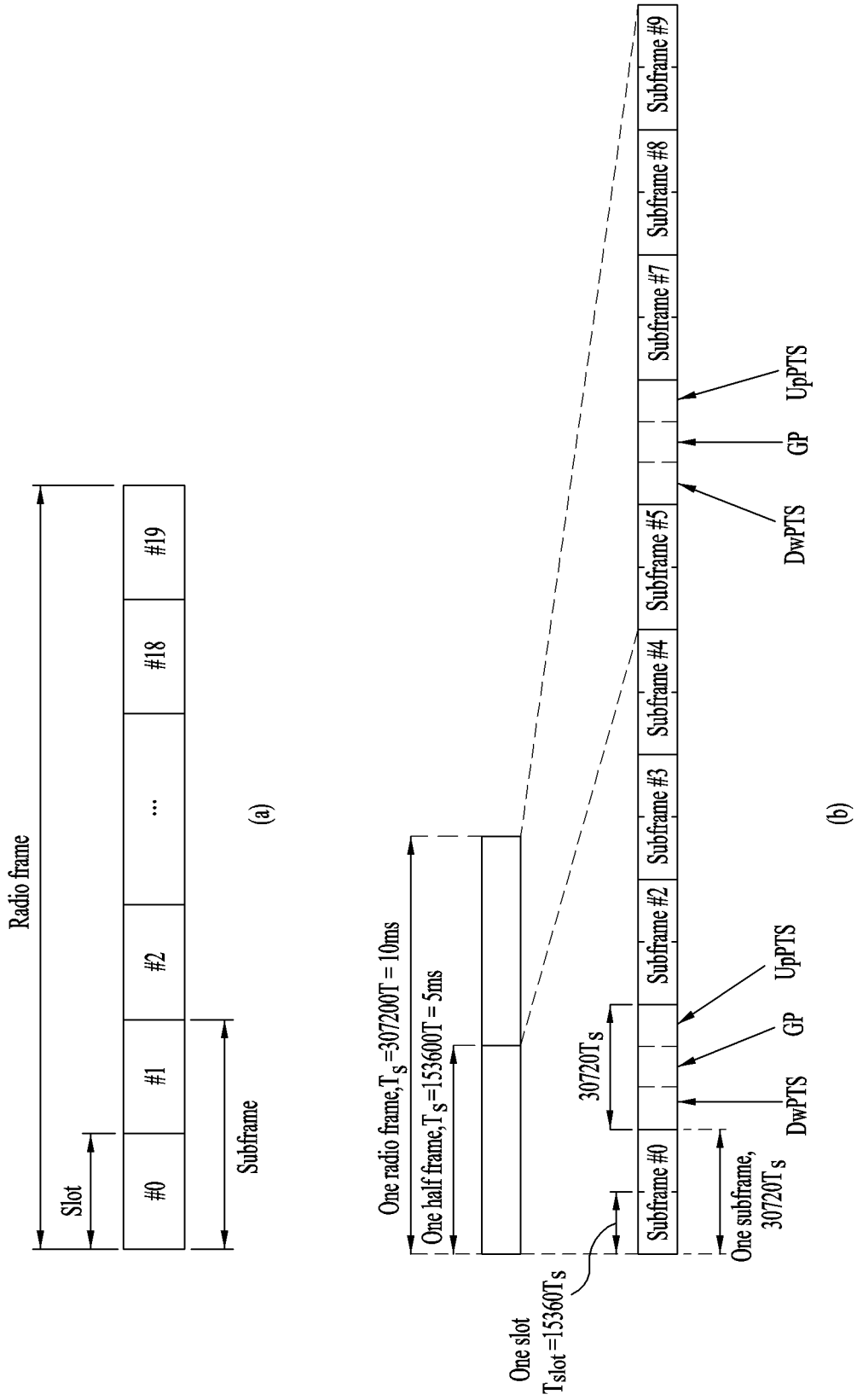
FIG. 4 shows a structure of a downlink (DL) radio subframe used by an LTE system.

The structure of a radio frame of 3GPP LTE system will be described with reference to FIG. 4.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 4(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 4(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots.

The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The current 3GPP standard document defines configuration of the special subframe as shown in Table 2 below. Table 2 shows DwPTS and UpPTS given when TS=1/(15000*2048), and the other region is configured as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the LTE TDD system, uplink/downlink subframe configurations (UL/DL configurations) are given as shown in Table 1 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe, and S denotes the special subframe. Table 1 also shows downlink-to-uplink switch-point periodicity in uplink/downlink subframe configuration of each system.

The structure of the above radio frame is just example. The number of a subframe, the number of slot included in a subframe or the number of symbol included in a slot included in the radio frame can be changed.

Figure 5:
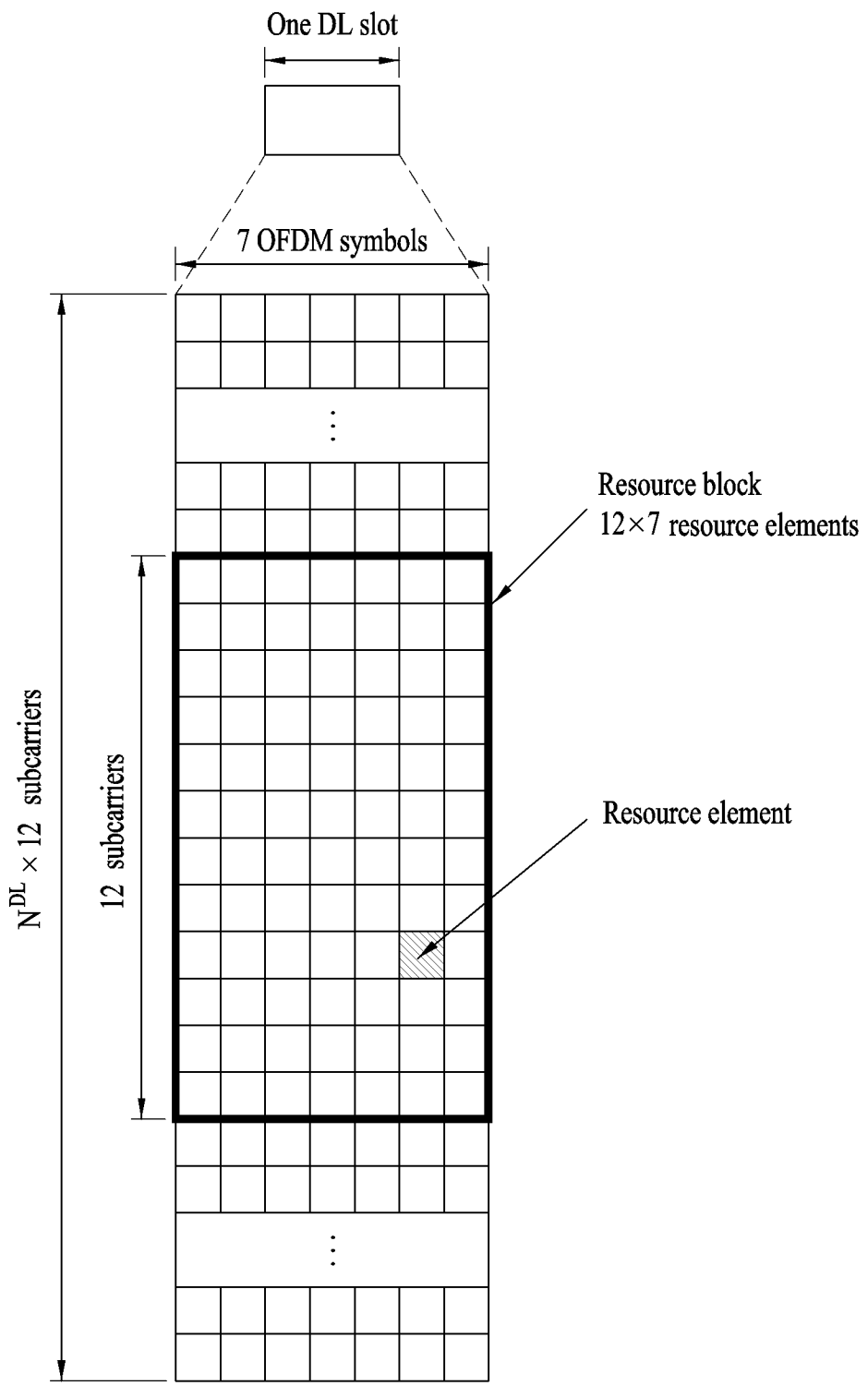
FIG. 5 shows a resource grid for a downlink slot.

FIG. 5 is a diagram illustrating a resource grid for a downlink slot.

Referring to FIG. 5, a DL slot includes $N_{symb}^{DL}$ OFDM symbols in the time domain and $N_{RB}^{DL}$ resource blocks in the frequency domain. Since each resource block includes $N_{sc}^{RB}$ subcarriers, the DL slot includes $N_{RB}^{DL} \times N_{sc}^{RB}$ subcarriers in the frequency domain. Although FIG. 5 illustrates that the DL slot includes seven OFDM symbols and the resource block includes twelve subcarriers, it is to be understood that the downlink slot and the resource block are not limited thereto. For example, the number of OFDM symbols included in the downlink slot may be varied depending on a length of CP (cyclic prefix).

Each element on the resource grid is referred to as a resource element (RE). One resource element is indicated by one OFDM symbol index and one subcarrier index. One RB includes $N_{symb}^{DL} \times N_{sc}^{RB}$ number of REs. The number $N_{RB}^{DL}$ of RBs included in the DL slot depends on a DL transmission bandwidth configured in a cell.

Figure 6:
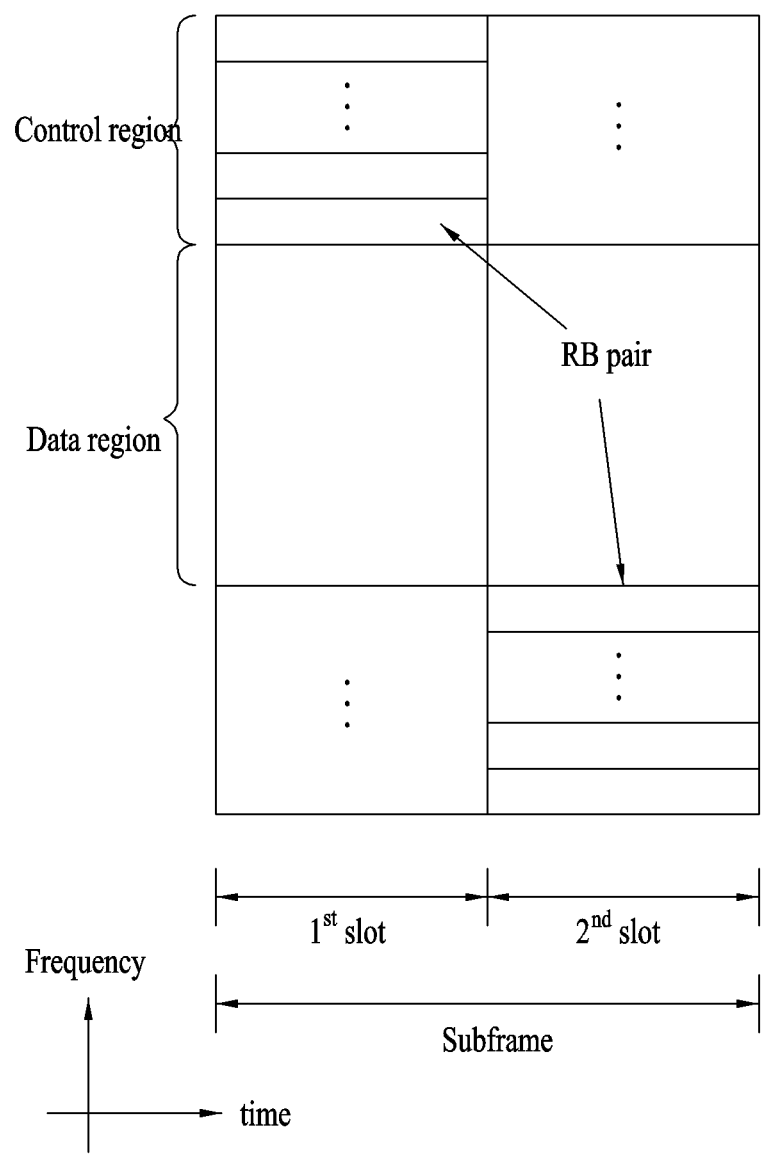
FIG. 6 shows one example of a structure of a downlink (DL) subframe.

FIG. 6 illustrates a structure of an uplink subframe applicable to embodiments of the present invention.

Referring to FIG. 6, a UL subframe may be divided into a control region and a data region in the frequency domain. A PUCCH for carrying uplink control information is allocated to the control region and a PUSCH for carrying user data is allocated to the data region. In the LTE system, a UE does not simultaneously transmit the PUCCH and the PUSCH to maintain a single carrier property. However, in the LTE-A system, a PUCCH signal and a PUSCH signal can be simultaneously transmitted due to the introduction of carrier aggregation technology. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 7:
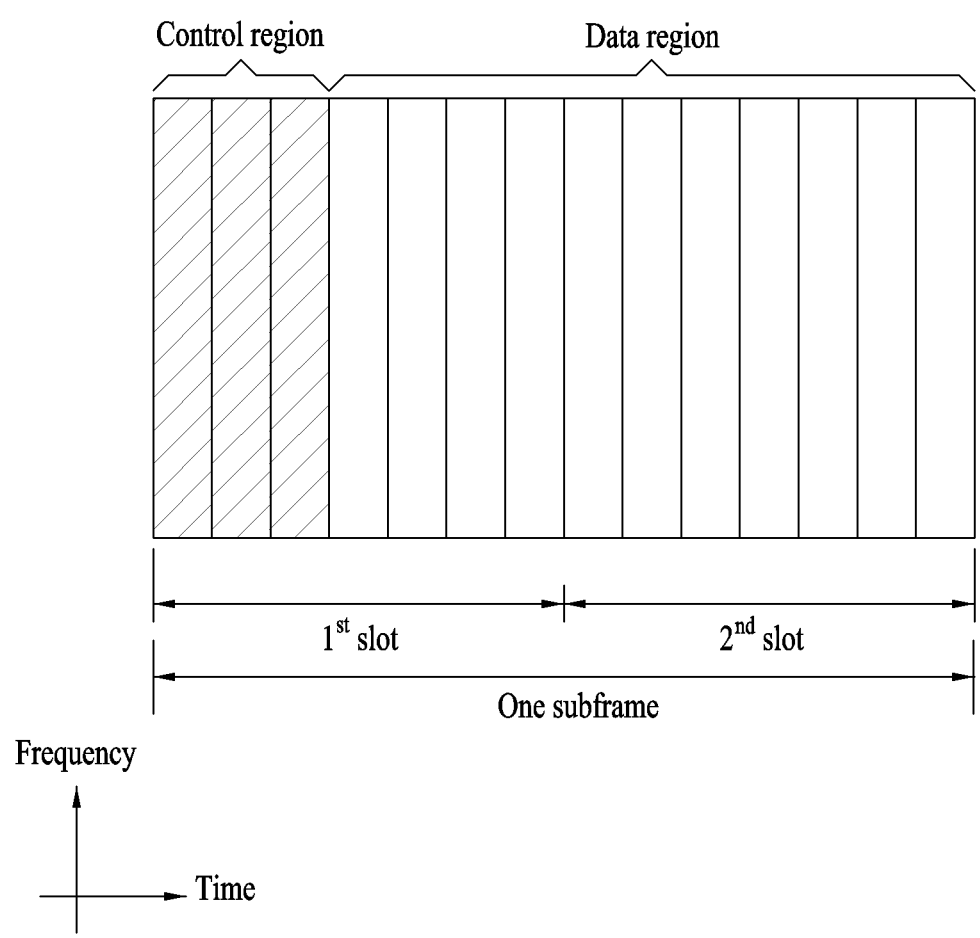
FIG. 7 shows a structure of an uplink (UL) subframe used by LTE.

FIG. 7 is a diagram illustrating a structure of a downlink subframe applicable to embodiments of the present invention.

Referring to FIG. 7, a maximum of three OFDM symbols from OFDM symbol index #0 of a first slot in a subframe correspond to a control region to be assigned with a control channel. The remaining OFDM symbols correspond to a data region to be assigned with a PDSCH. Examples of downlink control channels used in the 3GPP LTE system includes a physical control format indicator channel (PCFICH), a physical downlink control channel (PDCCH), a physical hybrid ARQ indicator channel (PHICH), etc.

The PCFICH is transmitted in a first OFDM symbol of a subframe and carries information on the number of OFDM symbols used for transmission of control channels (i.e. the size of the control region) in the subframe. The PHICH is a channel in response to UL transmission and carries ACK/NACK (acknowledgement/negative-acknowledgement) signal for HARQ (hybrid automatic repeat request). Control information transmitted through the PDCCH is called downlink control information (DCI). The DCI includes UL resource allocation information, DL resource allocation information, or UL transmit (TX) power control commands for a random UE group.

Carrier Aggregation

Figure 8:
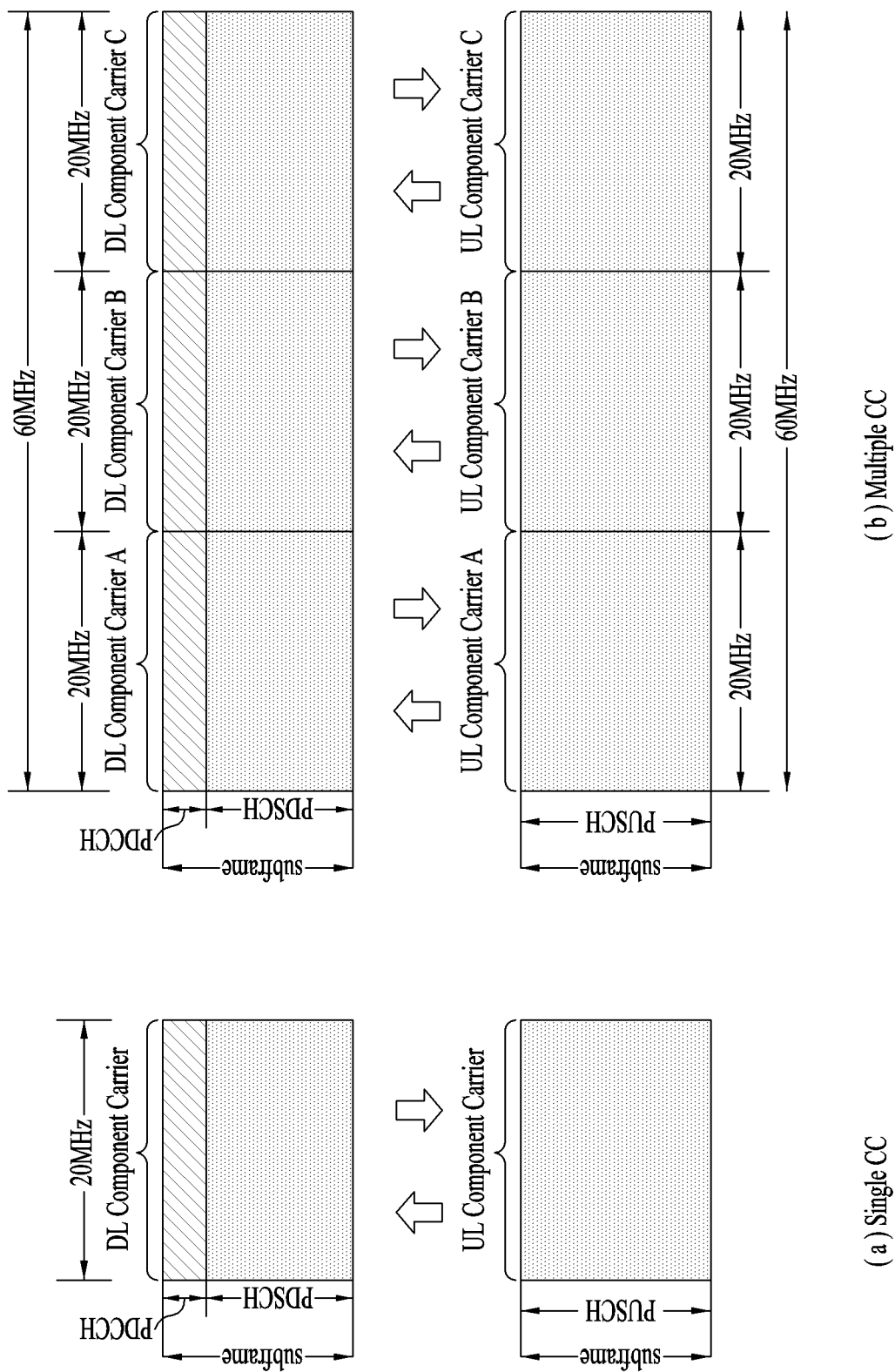
FIG. 8 is a diagram to describe carrier aggregation (CA).

FIG. 8 is a diagram for explaining carrier aggregation. Before description is given of carrier aggregation, the concept of a cell introduced to manage radio resources in LTE-A will be described first. A cell may be regarded as a combination of downlink resources and uplink resources. The uplink resource is not an essential element of the cell. The uplink resources are not essential elements and thus the cell may be composed of the downlink resources only or both of the downlink resources and uplink resources. However, this is the definition defined in the LTE-A release 10 and the cell may be composed of the uplink resources only. The DL resource may be called a downlink component carrier (DL CC) and the UL resource may be called an uplink component carrier (UL CC). The UL CC and the DL CC can be represented by a carrier frequency. The carrier frequency means a center frequency of a corresponding cell.

Cells may be divided into a primary cell (PCell), which operates at a primary frequency, and a secondary cell (SCell), which operates at a secondary frequency. The PCell and the SCell may be collectively referred to as a serving cell. The PCell may be designated during an initial connection establishment, connection re-establishment or handover procedure of a UE. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection and it may be used for providing additional radio resources. In the carrier aggregation environment, all serving cells except the PCell may be considered as SCells. In case that a UE in an RRC_CONNECTED state fails to establish the carrier aggregation or does not support the carrier aggregation, only a single serving cell consisting of PCells exists. On the other hand, in the case in which a UE is in the RRC_CONNECTED state and the carrier aggregation is established, one or more serving cells exist. Moreover, in this case, PCells and all SCells are included in the serving cells. After starting an initial security activation procedure, a network may configure one or more SCells in addition to the PCell configured at the beginning of the connection establishment procedure for a UE supporting the carrier aggregation.

Hereinafter, the carrier aggregation is described with reference to FIG. 8. The carrier aggregation is a technology introduced to allow the use of a broader band to meet the demands for a high-speed transmission rate. The carrier aggregation may be defined as aggregation of two or more component carriers (CCs) having different carrier frequencies or aggregation of two or more cells. Referring to FIG. 8, FIG. 8 (a) shows a subframe in the legacy LTE system in which one CC is used and FIG. 8 (b) shows a subframe to which the carrier aggregation is applied. Particularly, FIG. 8 (b) illustrates an example in which a bandwidth of total 60 MHz is supported in a manner of using three CCs of 20 MHz. In this case, the three CCs may be contiguous or non-contiguous.

A UE may simultaneously receive and monitor downlink data through a plurality of DL CCs. Linkage between a DL CC and a UL CC may be indicated by system information. The DL CC/UL CC link may be fixed in the system or may be semi-statically configured. Additionally, even if an entire system band is configured with N CCs, a frequency band that can be monitored/received by a specific UE may be limited to M(<N) CCs. Various parameters for the carrier aggregation may be set up cell-specifically, UE group-specifically, or UE-specifically.

Figure 9:
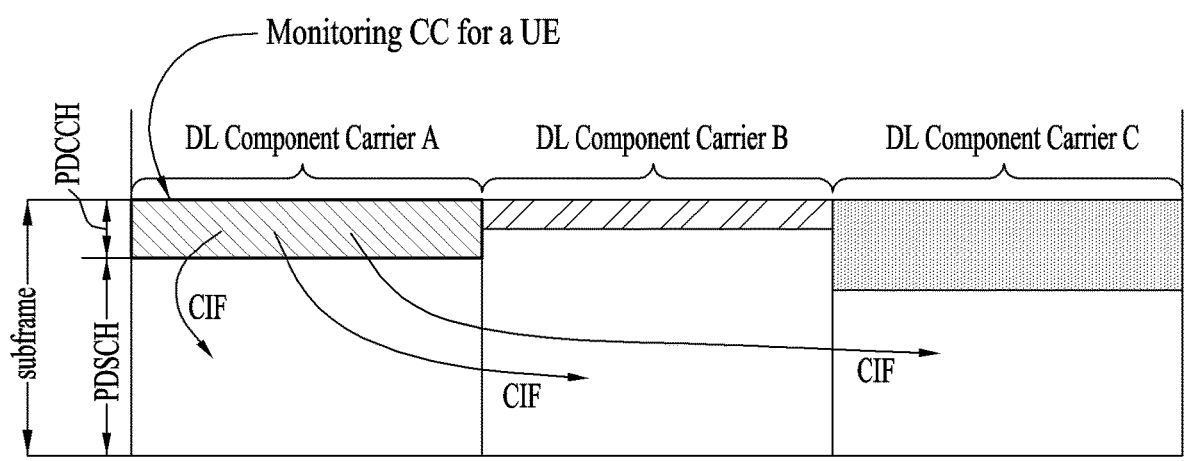
FIG. 9 is a diagram to describe cross-carrier scheduling.

FIG. 9 is a diagram for explaining cross carrier scheduling. For instance, the cross carrier scheduling means to include all DL scheduling allocation information of a DL CC in a control region of another DL CC selected from a plurality of serving cells. Alternatively, the cross carrier scheduling means to include all UL scheduling grant information on a plurality of UL CCs, which are linked to a DL CC selected among a plurality of serving cells, in a control region of the DL CC.

Hereinafter, a carrier indicator field (CIF) will be described.

As described above, the CIF may be included in a DCI format transmitted through a PDCCH (in this case, a size of the CIF may be defined as, for example, 3 bits) or may not be included in the DCI format (in this case, a size of the CIF may be defined as 0 bit). If the CIF is included in the DCI format, this indicates that the cross-carrier scheduling is applied. In case that the cross-carrier scheduling is not applied, downlink scheduling allocation information is valid for a DL CC through which the downlink scheduling allocation information is currently transmitted. In addition, an uplink scheduling grant is valid for a UL CC linked to the DL CC through which the downlink scheduling allocation information is transmitted.

In case that the cross-carrier scheduling is applied, the CIF indicates a CC related to the downlink scheduling allocation information which is transmitted over the PDCCH in a DL CC. For example, referring to FIG. 9, downlink allocation information on DL CC B and DL CC C, i.e., information on PDSCH resources, is transmitted through a PDCCH in a control region of DL CC A. After monitoring DL CC A, a UE may recognize that a resource region of PDSCH and the corresponding CC.

Whether or not the CIF is included in the PDCCH may be set semi-statically and the CIF may be enabled UE-specifically through higher layer signaling.

When the CIF is disabled, a PDCCH in a specific DL CC allocates a PDSCH resource in the same DL CC and may also allocate a PUSCH resource in a UL CC linked to the specific DL CC. In this case, a coding scheme, CCE-based resource mapping, a DCI format, and the like identical to those in the legacy PDCCH structure may be applied.

On the other hand, when the CIF is enabled, a PDCCH in a specific DL CC may allocate a PDSCH/PUSCH resource in a single DL/UL CC indicated by the CIF, among a plurality of the aggregated CCs. In this case, the CIF may be additionally defined in the legacy PDCCH DCI format. That is, the CIF may be defined as a field with a fixed length of 3 bits. Alternatively, a CIF position may be fixed regardless of a size of the DCI format. The coding scheme, CCE-based resource mapping, DCI format, and the like of the legacy PDCCH structure may also be applied to this case.

When the CIF exists, an eNB may allocate a DL CC set in which the PDCCH is to be monitored. Accordingly, the burden of blind decoding to a UE may be lessened. The PDCCH monitoring CC set corresponds to a portion of all aggregated DL CCs and the UE may perform PDCCH detection/decoding only in the corresponding CC set. In other words, to perform PDSCH/PUSCH scheduling for a UE, the eNB may transmit the PDCCH only in the PDCCH monitoring CC set. The PDCCH monitoring DL CC set may be configured UE-specifically, UE group-specifically or cell-specifically. For example, when 3 DL CCs are aggregated as shown in the example of FIG. 9, DL CC A may be set as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case that the DL CC A is set as the PDCCH monitoring CC, the PDCCH may not be transmitted in DL CC B and DL CC C.

Transmission Timing Adjustments

In the LTE system, the amount of time that a signal transmitted from a UE takes to reach an eNB may vary depending on a radius of a cell, a location of the UE in a cell, mobility of the UE, and the like. That is, unless the eNB controls a UL transmission timing of each UE, interference may occur between UEs while each UE communicates with the eNB. Moreover, this may increase an error occurrence rate of the eNB. The amount of time that the signal transmitted from the UE takes to reach the eNB may be referred to as a timing advance. Assuming that a UE is randomly located randomly in a cell, the timing advance from the UE to the eNB may vary depending on a location of the UE. For instance, if the UE is located at the boundary of the cell instead of at the center of the cell, the timing advance of the UE may be increased. In addition, the timing advance may vary depending on a frequency band of the cell. Thus, the eNB needs to be able to manage or adjust transmission timings of UEs in the cell to prevent the interference between UEs. The management or adjustment of transmission timings, which is performed by the eNB, may be referred to as timing advance maintenance or time alignment.

The timing advance maintenance or time alignment may be performed in a random access procedure. During the random access procedure, an eNB may receive a random access preamble from a UE and then calculate a timing advance value using the received random access preamble. The UE may receive the calculated timing advance value through a random access response and then update a signal transmission timing based on the received timing advance value. Alternatively, after receiving an uplink reference signal (e.g., SRS (sounding reference signal) that is transmitted periodically or aperiodically from the UE, the eNB may calculate the timing advance. Thereafter, the UE may update the signal transmission timing based on the calculated timing advance value.

As described above, the eNB may measure UE's timing advance through the random access preamble or the uplink reference signal and then inform the UE of an adjustment value for the time alignment. Here, the adjustment value for time alignment may be referred to as a timing advance command (TAC). The TAC may be processed by a MAC layer. If a UE receives the TAC from the eNB, the UE assumes that the received TAC is valid only for a prescribed time. A time alignment timer (TAT) may be used for indicating the prescribed time. A TAT value may be transmitted to the UE through higher layer signaling (e.g., RRC signaling).

A UE may start transmission of uplink radio frame #i $(N_{TA}+N_{TAoffset}) \times T_s$ seconds before the start of a corresponding downlink radio frame, where $0 \leq N_{TA} \leq 20512$, $N_{TAoffset}=0$ in case of a FDD frame structure, and $N_{TAoffset}=624$ in case of a TDD frame structure. $N_{TA}$ may be indicated by the TAC and $T_s$ represents a sampling time. The UL transmission timing may be adjusted in unit of a multiple of $16T_s$. The TAC may be given as 11 bits in the random access response and it may indicate a value of 0 to 1282. In addition, $N_{TA}$ may be given TA*16. Alternatively, the TAC may be given as 6 bits and it may indicate a value of 0 to 63. In this case, $N_{TA}$ is given as $N_{TA,old}+(TA-31)*16$. The TAC received in subframe n may be applied starting from subframe n+6.

TAG (Timing Advance Group)

In case that a UE use a plurality of serving cells, there may be serving cells having similar timing advance characteristics. For example, serving cells having similar frequency characteristics (e.g. frequency bands) or similar propagation delays may have similar timing advance characteristics. Thus, when carrier aggregation is performed, serving cells having similar timing advance characteristics may be managed as a group to optimize signaling overhead caused by synchronization adjustment of a plurality of uplink timings. Such a group may be referred to as a timing advance group (TAG). Serving cell(s) having similar timing advance characteristics may belong to one TAG and at least one serving cell(s) in the TAG must have uplink resources. For each serving cell, an eNB may inform a UE of TAG allocation using a TAG identifier through higher layer signaling (e.g. RRC signaling). Two or more TAGs may be configured for one UE. If a TAG identifier indicates 0, this may mean a TAG including a PCell. For convenience, the TAG including the PCell may be referred to as a primary TAG (pTAG) and TAG(s) other than the pTAG may be referred to as a secondary TAG (sTAG or secTAG). A secondary TAG identifier (sTAG ID) may be used to indicate an sTAG corresponding to an SCell. If an sTAG ID is not configured for an SCell, the SCell may be configured as a part of pTAG. One TA may be commonly applied to all CCs included in one TA group.

Hereinafter, a description will be given of a structure of TAC MAC CE for transmitting the TAC to a UE.

TAC MAC CE (Timing Advance Command MAC CE)

In 3GPP LTE, a MAC (Medium Access Control) PDU (Protocol Data Unit) includes a MAC header, a MAC CE (control element) and at least one MAC SDU (service data unit). The MAC header includes at least one subheader, and each of the at least one subheader corresponds to the MAC CE and the MAC SDU. The subheader indicates lengths and features of the AC CE and the MAC SDU.

The MAC SDU is a data block coming from a higher layer (e.g., RLC layer, RRC layer) of a MAC layer, and the MAC CE is used to deliver control information of the MAC layer like a buffer status report.

The MAC subheader includes fields as follows.

R (1 bit): Reserved field

E (1 bit): Extension field. This indicates whether F and L fields exist next.

LCID (5 bit): Logical Channel ID field. This indicates a MAC CE of a specific type or a MAC SDU of a specific logical channel.

F (1 bit): Format. This indicates whether a size of a next L field is 7 bits or 15 bits.

L (7 or 15 bit): Length field. This indicates a length of MAC CE or MAC SDU corresponding to a MAC subheader.

The F and L fields are not included in the MAC subheader corresponding to a fixed-sized MAC CE.

Figure 10:
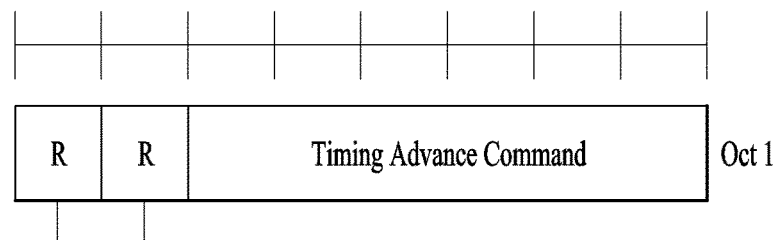
FIG. 10 shows a structure of TAC MAC CE.

FIG. 10 shows a TAC MAC CE as a fixed-sized MAC CE. TAC is used to control a size of time adjustment that will be applied by a user equipment, and is identified by LCID of a MAC PDU subheader. In this case, the MAC CE has a fixed size and is configured with a single octet shown in FIG. 10.

R (1 bit): Reserved field

TAC (Timing Advance Command) (6 bit): This indicates a $T_A$ index value (0, 1, 2 . . . 63) used to control a total size of a timing adjustment value a user equipment should apply.

An adjustment value for timing alignment may be transmitted through a Timing Advance Command (TAC), or a response message (Random Access Response, hereinafter named RAR) to a random access preamble transmitted for an initial access by a user equipment. A method of performing a random access procedure proposed to receive TAC is described as follows.

Random Access Procedure

In an LTE system, a user equipment can perform a random access procedure according to the following cases.

Case that a user equipment performs an initial access due to an absence of a connection to a base station (RRC Connection)

Case that a user equipment initially accesses a target cell in a handover procedure Case that a request is made according to a command of a base station Case that data in uplink is generated in a situation that uplink time synchronization is not matched or that a designated radio resource used to request a radio resource is not allocated Case of restoration due to a radio link failure or a handover failure Based on the above description, a general contention based random access procedure is described as follows.

(1) First Message Transmission

First of all, a user equipment randomly selects a random access preamble from a set of random access preambles indicated through a system information or a handover command, selects a PRACH (physical RACH) resource capable of carrying the random access preamble, and is then able to transmit the selected random access preamble.

(2) Second Message Reception.

Having transmitted the random access preamble, the user equipment attempts its reception of a random access response within a random access response receiving window indicated through the system information or the handover command of the base station [S902]. In particular, the random access response information may be transmitted in form of MAC PDU. And, the MAC PDU may be delivered through PDSCH (physical downlink shared channel). In order to properly receive the information carried on the PDSCH, the user equipment preferably monitors PDCCH (physical downlink control channel). In particular, it is preferable that information of the user equipment supposed to receive the PDSCH, frequency and time information of a radio resource of the PDSCH, a transmission format of the PDSCH and the like are included in the PDCCH. Once the user equipment succeeds in the reception of the PDCCH sent to the user equipment, it is able to appropriately receive the random access response carried on the PDSCH according to the informations of the PDCCH. In the random access response, a random access preamble identifier (ID; e.g., RAPID (Random Access Preamble IDentifier), a UL grant indicating a UL radio resource (UL Grant), a temporary cell identifier (Temporary C-RNTI), and a time synch correction value (Timing Advance Command: TAC) may be included.

As mentioned in the above description, the reason why the random access (or random access) preamble identifier is required for the random access response is that, since random access response information for at least one or more user equipments may be included in a single random access response, it is necessary to indicate that the UL grant, the temporary cell identifier and the TAC are valid for which one of the user equipments. In the present step, assume that the user equipment selects a random access preamble identifier matching the random access preamble selected by the user equipment. Through this, the user equipment can receive a UL grant, a temporary cell identifier (Temporary C-RNTI), a time sync correction value (Timing Advance) and the like.

(3) Third Message Transmission

In case that the user equipment receives a random access response valid for the user equipment, it processes each of the informations included in the random access response. Namely, the user equipment applies a TAC and saves a temporary cell identifier. And, the user equipment can save data, which is to be sent in response to a valid random access response reception, to a message-3 buffer.

Meanwhile, the user equipment transmits data (i.e., a third message) to the base station using a received UL grant. The third message should contain an identifier of the user equipment. In a contention based random access procedure, the base station is unable to determine what kinds of user equipments perform the random access procedure. Thus, in order to resolve contention in the future, it is necessary to identify a user equipment.

Two kinds of methods for including an identifier of a user equipment have been discussed. According to a first method, if a user equipment already possesses a valid cell identifier assigned by a corresponding cell before the random access procedure, the user equipment transmits a cell identifier of its own through a UL transmission signal corresponding to the UL grant. On the other hand, if the valid cell identifier fails to be assigned to the user equipment before the random access procedure, the user equipment transmits its unique identifier (e.g., S-TMSI, Random ID). Generally, the unique identifier is longer than the cell identifier. If the user equipment transmitted data corresponding to the UL grant, a contention resolution timer (hereinafter abbreviated a CR timer) is initiated.

(4) Fourth Message Reception

After the user equipment has transmitted the data containing the identifier of the user equipment through the UL grant included in the random access response, the user equipment waits for an instruction of the base station for the contention resolution. In particular, the user equipment attempts a reception of PDCCH to receive a specific message [S904]. Regarding a method of receiving the PDCCH, two kinds of methods have been discussed. As mentioned in the foregoing description, if the third message sent in response to the UL grant is sent using the cell identifier of the user equipment, the user equipment attempts the repletion of the PDCCH using the cell identifier of the user equipment. If the identifier is a unique identifier, the user equipment can attempt the reception of the PDCCH using a temporary cell identifier contained in the random access response. Thereafter, in the former case, if the user equipment receives the PDCCH through the cell identifier of its own before expiration of the contention resolution timer, the user equipment determines the random access procedure is normally completed and then ends the random access procedure. In the latter case, if the user equipment receives the PDCCH through the temporary cell identifier before expiration of the contention resolution timer, the user equipment checks the data delivered by PDSCH indicated by the PDCCH. If the unique identifier of the user equipment is included in the contents of the data, the user equipment determines the random access procedure is normally completed and then ends the random access procedure.

Meanwhile, with respect to an operation in a non-contention based random access procedure, unlike the contention based random access procedure shown in FIG. 7, a random access procedure ends with a first message transmission and a second message transmission only. Yet, before the user equipment transmits a random access preamble as a first message to the base station, the base station assigns a random access preamble to the user equipment. Subsequently, the user equipment transmits the assigned random access preamble as a first message to the base station and then receives a random access response from the base station, whereby the random access procedure ends.

With respect to the present invention, the base station can trigger PRACH as a PDCCH command through PDCCH in order to secure synchronization. If so, the user equipment transmits a PRACH preamble to the base station. The PRACH preamble transmission for the user equipment to match synchronization is a contention-based PRACH preamble transmission. In response to the received first message, the base station sends a random access response message to the user equipment. In this case, in the random access response message, TAC and contents shown in Table 3 are included. Table 7 shows information included in a random access (RA) response grant in 3GPP LTE TS 36.213.

TABLE 3

| Contents | Number of bit(s) |
|---|---|
| Hopping flag | 1 |
| Fixed size resource block assignment | 10 |
| Truncated modulation and coding scheme | 4 |
| TPC command for scheduled PUSCH | 3 |
| UL delay | 1 |
| CSI request | 1 |

Case of Having Plurality of TAs

Figure 11:
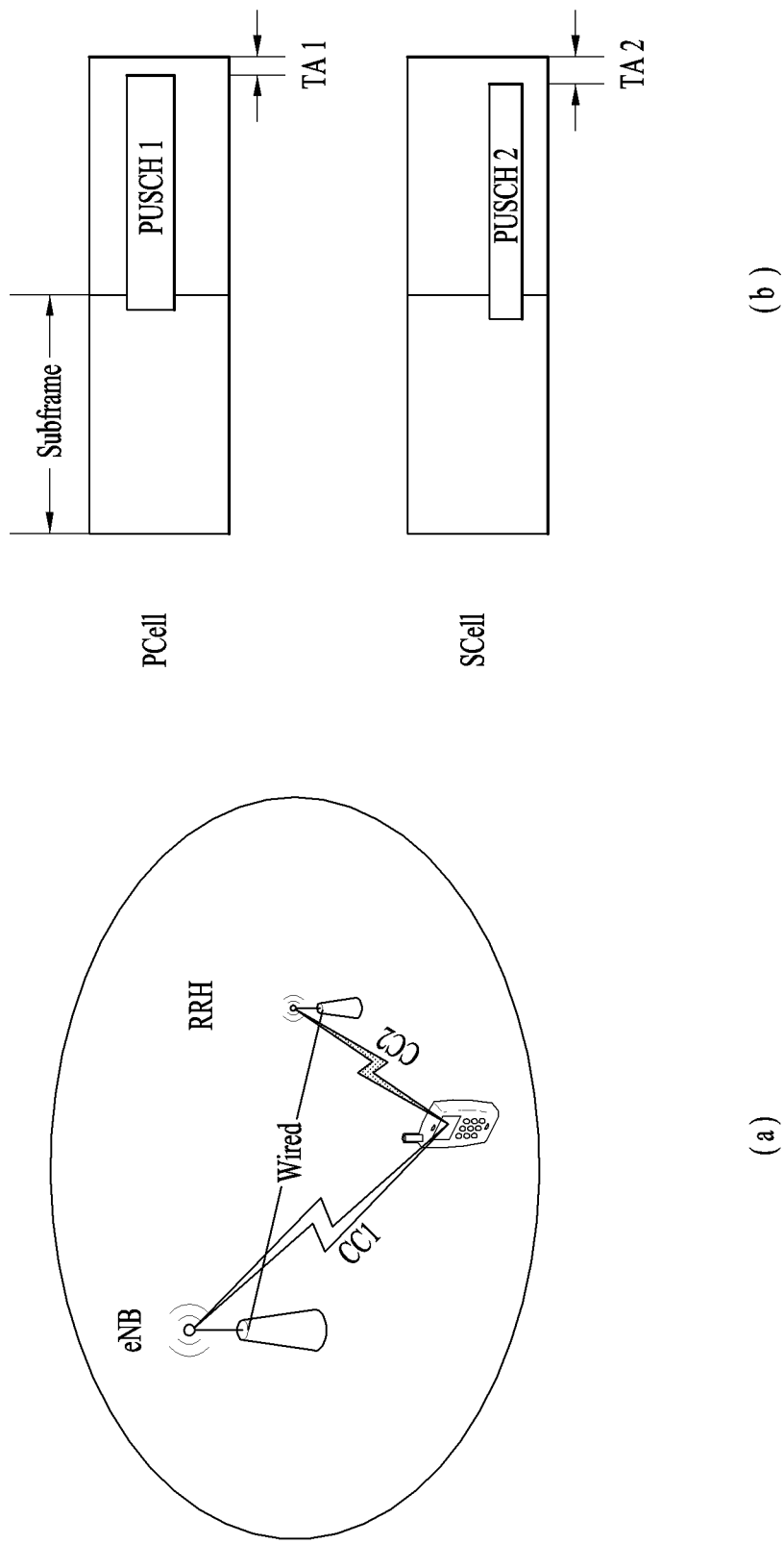
FIG. 11 shows an example of aggregating a plurality of cells having different frequency characteristics.

FIG. 11 shows an example of aggregating a plurality of cells having different frequency characteristics. In LTE Release 8/9/10 system, when a user equipment also aggregates a plurality of CCs, a TA (timing advance) value applicable to a single CC (e.g., PCell, P carrier) is applied to a plurality of CCs 'in common', thereby being applied to a UL transmission. In LTE-A system, a user equipment may be allowed to aggregate a plurality of cells belonging to different frequency bands (i.e., considerably spaced apart from each other on frequency), a plurality of cells having differing from each other in propagation delay property, or a plurality of cells having different coverages. In case of a specific cell, in order to extend a coverage or remove a coverage hole, it may be able to consider a situation that RRH (remote radio head) devices such as repeaters are deployed in a cell. For instance, carrier aggregation may be performed between cells formed in different sites [inter-site carrier aggregation]. RRH may be called RRU (remote radio unit). Each of a base station (eNB) and an RRH (or RRU) may be commonly called a node or a transmitting node.

For example, referring to FIG. 11 (a), a user equipment aggregates two cells (Cell 1, Cell 2). Cell 1 (or CC1) is configured to directly communicate with a base station (eNB) without RRH. And, Cell 2 may be configured using RRH due to a limited coverage and the like. In this case, a propagation delay (or a reception timing at eNB) of a UL signal transmitted through Cell 2 (or CC2) from the user equipment may be different from a propagation delay (or a reception timing at eNB) of a UL signal transmitted through Cell 1 due to such a reason as a user equipment location, a frequency characteristic and the like. Thus, in case that a plurality of cells have different propagation delay properties, having a plurality of TAs is inevitable.

Meanwhile, FIG. 11 (b) shows an example of a plurality of cells having different TAs. A user equipment aggregates two cells (e.g., PCell and SCell), and is able to transmit a UL signal (e.g., PUSCH) in a manner of applying different TAs to the cells, respectively.

When a user equipment receives a plurality of TAs, if a difference between a UL signal transmission timing of a specific cell (e.g., PCell) and a UL signal transmission timing of another cell, it is able to consider a scheme of restricting a UL signal transmission of the corresponding cell. For instance, if a gap between the transmission timings exceeds a specific threshold, it is able to consider a scheme of restricting a UL signal transmission of a corresponding cell. The specific threshold may include a value set to a higher signal or a value already known to a user equipment. Such an operation may be necessary to prevent an occurrence of malfunction due to an irregular relation of UL/DL signal transmission timings between a base station and a user equipment in case of a considerable mismatch of a transmission timing of a signal transmitted in UL by the user equipment for example.

Moreover, if a timing difference in transmitting PUSCH/PUCCH and the like for different cells (CC) in the same subframe from a user equipment is considerable, complexity of UL signal configuration of the user equipment and complexity of response timing adjustment between UL and DL may increase considerably.

Hence, if UL transmission timings among a plurality of cells considerably mismatch each other due to independent TA operation, it may be able to consider a scheme of dropping a UL signal (e.g., PUSCH, PUCCH, SRS, RACH, etc.) of a user equipment or restricting a transmission timing. Particularly, the present invention proposes the following schemes.

Scheme 1)

If a TA difference between a plurality of cells for a user equipment to perform a UL transmission is equal to or greater than a threshold, it is able to adjust a TA difference between actually transmitted UL signals into a range of the threshold by always dropping a UL transmission of a random cell. In this case, it is able to drop a transmission of a UL signal for a cell having a TA difference exceeding the threshold with reference to a specific cell. In particular, the specific cell may include a PCell or a PCell group. Alternatively, a network may be able to configure the specific cell through RRC signaling or the like. In doing so, an operation of dropping a UL signal transmission may include an operation of not transmitting a signal set to be transmitted in advance or an operation of not expecting or ignoring a scheduling command of PUCCH or the like for a corresponding cell in case that the TA difference exceeds the threshold.

Scheme 2)

If a TA difference between a plurality of cells for a user equipment to perform a UL transmission is equal to or greater than a threshold, the transmission is performed in a manner of adjusting a UL transmission timing of a random cell into a range of a TA in comparison with a transmission timing of another cell. In this case, it is able to adjust a transmission timing of a UL signal for a cell having a TA difference exceeding the threshold with reference to a specific cell. In this case, the specific cell may include a PCell or a PCell group. Alternatively, a network may be able to configure the specific cell through RRC signaling or the like.

Scheme 3)

If a user equipment receives a TAC, of which TA difference between a plurality of cells for a user equipment to perform a UL transmission is equal to or greater than a threshold, the user equipment ignores the corresponding TAC or applies it only if the TA difference is in a range of the threshold. In this case, it is able to apply this scheme in case of receiving a TAC having a TA difference exceeding the threshold with reference to a specific cell. In this case, the specific cell may include a PCell or a PCell group. Alternatively, a network may be able to configure the specific cell through upper layer signaling (e.g., RRC signaling) or the like.

According to the above schemes, a TA threshold can be set by a network through upper layer signaling (e.g., RRC signaling) or the like. And, the cell may include a plurality of cell groups, and more particularly, a cell group having the same TAC applied thereto. The TA difference may include a TA value difference a user equipment should apply to a transmission in a specific subframe, a value difference in a RAC received by a user equipment, or a transmission timing difference a user equipment will apply to a transmission as well as a difference of a TA value managed by a user equipment. Moreover, like PRACH in the above scheme, the TA difference restriction scheme may not apply to a signal transmission exempt from a TA application managed through a TAC value.

D2D (Device to Device) Communication

If D2D communication is introduced into the aforementioned wireless communication system (e.g., 3GPP LTE system, 3GPP LTE-A system), a detailed scheme for performing a D2D communication is described as follows.

In the following description, a D2D communication environment used in the present invention is schematically described.

A D2D (device to device) communication means a communication between electronic devices as the expression stands. In a broad sense, the D2D communication means a wired or wireless communication between electronic devices or a communication between a device controlled by a man and a machine. Recently, the D2D communication generally means a wireless communication between electronic devices, which is performed without human involvement.

Figure 12:
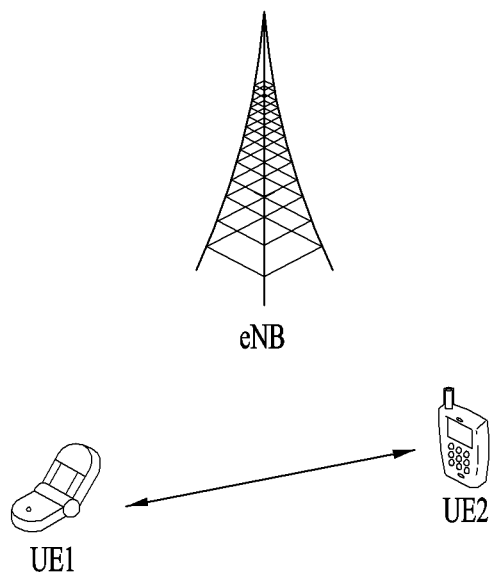
FIG. 12 shows an example of a communication system applicable to the present invention.

FIG. 12 is a diagram to conceptually describe a D2D communication. FIG. 12 illustrates a D2D or UE-to-UE communication scheme as one example of a D2D communication, by which a data exchange between user equipments can be performed without a base station. Thus, a link directly established between devices can be named a D2D link. Compared to the existing base station oriented communication systems, the D2D communication is advantageous in reducing latency and requiring less radio resources. In this case, the UE (user equipment) means a user's terminal. Yet, if a network equipment such as an eNB transceives signals according to a communication system between UEs, it can be also regarded as a sort of a UE.

Although the D2D communication supports a device-to-device (or UE-to-UE) communication without a base station, since the D2D communication is performed in a manner of reusing a resource of an existing wireless communication system (e.g., 3GPP LTE/LTE-A), the D2D communication should avoid interference or disturbance of the existing wireless communication system. In the same context, it is also important to minimize interference in the D2D communication by a user equipment, a base station and the like operating in the existing wireless communication system.

A specific UE can assume a UL CC carrier aggregation situation in which a plurality of serving cells are configured for UL carriers. In this case, for the transmission/reception of D2D signal and WAN signal, a UE can operate at least in a manner of transceiving the WAN signal on a single carrier (hereinafter named CC1) at a specific timing and also transceiving the D2D signal on another carrier (hereinafter named CC2).

Generally, a UE capable of carrier aggregation (CA) establishes a plurality of transceiving circuits. If a UE can perform a DL reception by combining two different bands together and configuring a single serving cell for each of the bands, the corresponding UE generally establishes two receiving circuits and is able to apply a single receiving circuit to a serving cell of each of the bands. The same principle may apply to CA of performing a plurality of UL transmissions. If a UE can perform a DL reception by combining two different bands together and configuring a single CC for each of the bands, the corresponding UE generally establishes two receiving circuits and is able to apply a single receiving circuit to a CC of each of the bands. In this case, the band can be interchangeably used with the aforementioned frequency band.

Although the following description is made by taking a case of configuring CA on at least two bands as one example, the principle mentioned in the present invention is apparently applicable to a case of inter-band CA of configuring CA on the same band and a case of non-CA of configuring a single cell on a single band only.

In this case, a region of a frequency, which can be processed by each transceiving circuit may be limited to a partial region. So to speak, in aspect of a specific receiving circuit, DL receptions on all available bands may not be possible and DL reception may be operable on some of selective bands only. This is to reduce implementation costs by restricting an operating frequency region of an individual transceiving circuit. In such a case, an eNB should be able to obtain what region corresponds to a frequency band on which a UE can operate as a transceiving circuit.

To this end, a UE can report a combination of bands the corresponding UE can support in CA situation through a process for accessing a network and the like. In particular, in case of DL CA, a UE can report a list of band combinations that can be supported by the corresponding UE.

Figure 13:
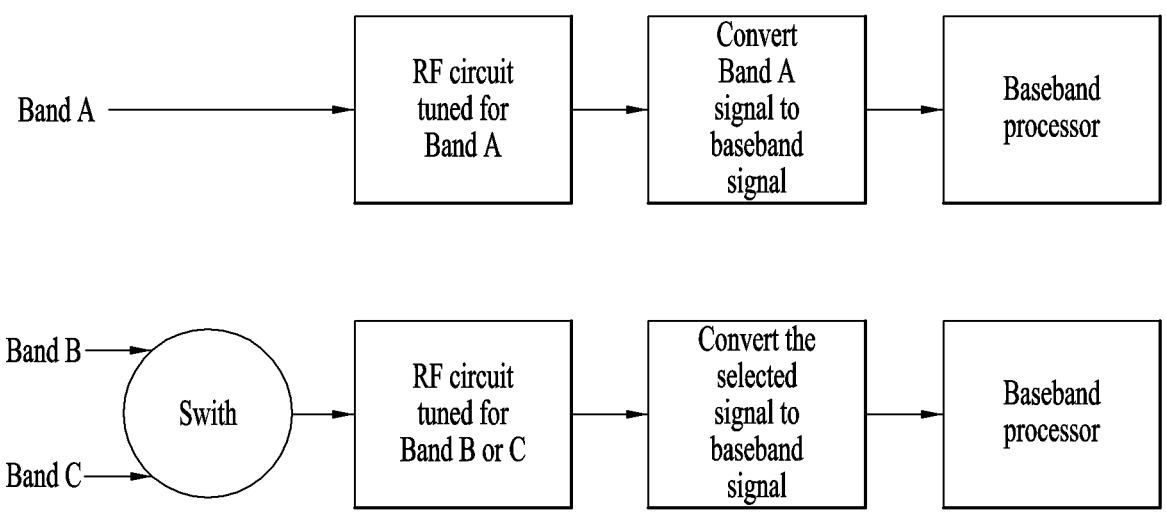
FIG. 13 is a diagram for an example of a receiving circuit applicable to the present invention.

FIG. 13 is a diagram for an example of a receiving circuit according to one embodiment of the present invention. Referring to FIG. 13, a receiving circuit 1 is always capable of a reception of Band A. Yet, a receiving circuit 2 can be selected from Band B and Band C. In this case, a UE can report two combinations (Band A, Band B) and (Band A, Band C) as a list of supportable band combinations. Thus, if the UE reports the two combinations, it means that the corresponding UE is set to perform a DL reception from two serving cells configured for Band A and Band B at a specific timing, respectively, or that the corresponding UE can be set to perform a DL reception from two serving cells configured for Band A and Band C at a specific timing, respectively.

Meanwhile, in case that a UE performs a D2D operation, it is necessary for an eNB to obtain that a signal of D2D can be transmitted or received on which band. With respect to this, the UE can report a band capable of a signal transmission or reception of D2D to the eNB. The eNB obtains a D2D operation available band and may utilize it for scheduling and the like for the UE based on the obtained band. In aspect of transceiving circuit implementation of UE, it may be effective that a circuit of transceiving D2D signal reuses an existing circuit of receiving a DL signal or transmitting a UL signal. In the following description, proposed are a method of efficiently operating D2D in the relation with an existing UL and DL signal transceiving circuit and a method for the same. Particularly, a D2D transmission operation and a D2D reception operation are separately described.

A. Embodiment 1: Case of D2D Transmission Operation

In case that UL carrier aggregation is available for a specific band combination, it can be regarded as D2D transmission is possible on the corresponding band combination.

Since a D2D signal is transmitted using a UL resource on a low interference level, it may be possible for a D2D transmitting circuit to reuse a UL transmitting circuit as it is. In particular, since a D2D signal and a UL signal are transmitted on the same frequency band, a separate additional operation is unnecessary but a form of a signal applied to a transmitting circuit varies depending on a D2D operation or a UL operation. Hence, if an uplink carrier aggregation (UL CA) is possible for a specific band combination, a specific UE can perform a D2D transmission operation. In this case, a band combination capable of a D2D transmission may be signaled. Yet, a D2D transmission or a UL transmission for the band combination may be performed without separate signaling.

On the other hand, if a specific UE reports that an uplink carrier aggregation is possible for a specific band combination, an eNB can regard a D2D transmission on the corresponding band combination as possible without additional signaling. Alternatively, a separate signaling for the corresponding band combination capable of the D2D transmission may be received from the UE.

For instance, if a combination of (Band A, Band B) is reported as a UL CA available combination, a corresponding UE can regard a D2D signal as transmittable on both Band A and Band B simultaneously. Of course, the UE can interpret that a D2D transmission and a UL transmission can be mixed in the corresponding band combination owing to the common features between the D2D transmission and the UL transmission. For instance, it is also possible to perform the D2D transmission on Band B while performing the UL transmission on Band A. In this case, the D2D transmission and the UL transmission can be multiplexed together in Band B by TDM scheme. In particular, the D2D transmission is performed in a partial time region of Band B and the UL transmission can be performed in another partial time region.

Herein, if signals can be transmitted on Band A and Band B, it can be interpreted differently according to a case. Interpretation of a band capable of transceiving signals shall be described later.

B. Embodiment 2: Case of D2D Reception Operation

Since a D2D reception operation should be performed on a UL resource, a receiving circuit requires predetermined modification in case of FDD scheme having a DL resource and a UL resource separated from each other on a frequency axis. The reason for this is that a circuit matching a DL frequency of a specific band should be moved to a UL frequency. Yet, since a DL frequency and a UL frequency of a same band are not spaced apart from each other considerably in general, moving an operating frequency of a prescribed receiving circuit to a UL frequency of a specific band from a DL frequency of the specific band can be implemented with ease relatively.

For instance, if a specific UE reports that a DL CC configuration is possible for a specific band combination, an eNB can regard a D2D reception as possible according to the corresponding band combination. If a combination of {Band A, Band B} is reported as a DL CC configuration possible combination (or DL CA possible combination), the corresponding UE can regard D2D signal as receivable on Band A and Band B simultaneously. Of course, the UE can operate in a manner of performing a DL reception on one band (e.g., Band A) while performing a D2D reception on the other band (e.g., Band B). Meanwhile, a presence or non-presence of D2D reception possibility for the specific band combination can be signaled with a separate signal.

Whether a DL reception and a D2D reception can be multiplexed within a single band by a TDM scheme may vary depending on whether an operation of switching a corresponding receiving circuit between a DL frequency and a UL frequency dynamically is possible. If the respective frequencies can be dynamically switched to each other, the DL reception and the D2D reception may be multiplexed within a single band by the TDM scheme. Alternatively, different D2D signals may be multiplexed by the TDM scheme. In this case, a UE performs the DL reception on a partial time resource region of the single band and is also able to perform the D2D reception on another partial time resource region.

Whether an operation of switching between a DL frequency and a UL frequency dynamically is possible or whether a TDM scheme is usable can be separately signaled. For instance, a presence or non-presence of the possibility of the operation on Band B for a combination (Band A, Band B) or a presence or non-presence of usability of TDM scheme is signaled. If possible, the DL reception and the D2D reception are regarded as performed in one partial time and another partial time on Band B, respectively, while performing the DL reception on Band A. Otherwise, if the DL reception is performed on Band A, only the DL reception or the D2D reception is regarded as performed continuously. Meanwhile, in order to further reduce the implementation cost of a specific receiving circuit or support a case that a specific circuit is specified for a band having a DL resource only without a UL resource, it is able to additionally signal whether only a DL reception is possible on each band of a specific band combination or whether the DL reception is also possible. For instance, for a combination (Band A, Band B), it is able to single whether each of Band A and Band B is usable for a D2D reception. In particular, if a presence or non-presence of possibility of a use for the D2D reception for the combination (Band A, Band B) is signaled, it can be interpreted as follows. First of all, in case that Band A and Band B are combined together, Band A can be used for one of the DL reception. Secondly, the D2D reception is impossible on Band B but only the D2D reception is possible on Band B.

C. Embodiment 3

Based on the aforementioned contents, Embodiment 1 and Embodiment 2, a method of signaling a D2D related capability of a UE is described as follows. For instance, a D2D related capability of a UE can be defined through an existing supported band capability. In case of signaling a D2D related capability using the existing 'supported band capability', interpretation or definition of the D2D related capability is proposed as follows.

Basically, a D2D UE performs an operation of transmitting a signal in a specific time and receiving a signal in another specific time on a same band. Hence, if a specific UE 'enables D2D on a specific band', it can be restricted as defined for a case that both D2D transmission and reception are possible on the corresponding band. Through such a restriction, it is able to simplify an overall operation by excluding a case that the specific UE can perform one of the D2D transmission and the D2D reception on the specific band. If such a restriction applies, since the UL CC configured band combination is generally different from the DL CC configured band combination, it is necessary to obtain a final D2D capable band combination based on the band combination difference. In the following description, a method for obtaining a combination of D2D capable bands capable of both a D2D transmission operation and a D2D reception operation is described.

Method 1-1) D2D is regarded as possible on all band combinations capable of UL transmission. Since a transmitting circuit is generally designed to meet a condition of reducing interference in another band or the like, implementation of the transmitting circuit requires a cost more than that of a receiving circuit. Hence, it is able specify that a UE automatically enables a D2D reception through an appropriate receiving circuit implementation on a UL transmission capable band combination. (As mentioned in the foregoing description, a D2D transmission can be assumed as always possible at a UL transmission possible site.) For instance, if a specific UE reports (Band A, Band B) as a UL transmission capable band, it means that the corresponding UE can operate D2D on the two bands simultaneously. In particular, the UE can determine that 9 operation combinations are possible as follows.

UL transmission on Band B while performing UL transmission on Band A

D2D transmission on Band B while performing UL transmission on Band A

D2D reception on Band B while performing UL transmission on Band A

UL transmission on Band B while performing D2D transmission on Band A

D2D transmission on Band B while performing D2D transmission on Band A

D2D reception on Band B while performing D2D transmission on Band A

UL transmission on Band B while performing D2D reception on Band A

D2D transmission on Band B while performing D2D reception on Band A

D2D reception on Band B while performing D2D reception on Band A

It may be impossible to support some of the operation combinations according to an interval between the two bands and implementation of UE for this. In this case, a fact that some of the operation combinations are impossible can be separately reported to an eNB. This shall be described later.

Method 1-2) D2D is regarded as possible at an intersection of a set of UL transmission capable combinations and a set of DL reception capable combinations. In particular, if both a UL transmission and a DL reception are simultaneously possible on a specific band or a band combination, D2D is regarded as possible on the corresponding band or the corresponding band combination. For instance, if D2d is possible on a band combination (Band A, Band B), this combination is simultaneously included in a UL transmission capable combination as well as in a DL reception capable combination.

Method 1-3) D2D is regarded as possible on a DL reception capable combination. In this case, a specific band combination may not be included in a UL transmission combination despite being included in a DL reception combination. In this case, a UE can operate through appropriate implementation in a manner of enabling a D2D transmission on the corresponding combination despite disabling a UL transmission.

If supporting a case that either a D2D transmission or a D2D reception is possible on a specific band, it is able to additionally consider Method 2 in the following.

Method 2) It is determined that a D2D reception is possible on a DL reception capable combination and that a D2D transmission is possible on a UL transmission capable combination. In this case, it may occur a case that a UL transmission is impossible on a specific band despite that a D2D reception is possible. And, the corresponding band may be used for the usage of the D2D reception only.

Meanwhile, as mentioned in the foregoing description, according to the interval between the two bands and the implementation of the UE for this, it may be impossible to support some of the operation combinations. Since a D2D signal is received on UL CC, in case that a transmission is performed on another adjacent UL CC, it may cause a problem that a D2D reception becomes impossible due to a severe interference caused by its own signal. In this case, the UL CC may include a same bad or an adjacent band. In doing so, an interval between a D2D received UL CC and a signal transmitted UL CC may become a reference for a presence or non-presence of simultaneous transmission and reception. For instance, if an interval between a D2D received UL CC and a signal transmitted UL CC is smaller than a specific value, it is able to determine that simultaneous transmission and reception is impossible. On the contrary, if an interval between a D2D received UL CC and a signal transmitted UL CC is greater than the specific value, it is able to determine that simultaneous transmission and reception is possible. In this case, the fact that some of the operation combinations are impossible can be separately reported to an eNB.

If a specific UE reports that D2D transmission and reception are possible for a specific band combination [e.g., (Band A, Band B)], the following interpretation (operating mode 1, operating mode 2) is possible correspondingly.

Operating mode 1) It is possible to receive a D2D signal on Band B while transmitting a signal on Band A. This may be named a full duplex.

Operating mode 2) In case of transmitting a signal on Band A, it is unable to simultaneously receive a D2D signal on Band B. Yet, a signal transmission on Band A and a D2D reception on Band B can be simultaneously set. And, it may mean that a reception on Band B is possible only if a signal transmission on Band A does not exist actually. This may be named a half duplex.

To resolve the vagueness between the two interpretations, a UE can add an indicator indicating that each band combination corresponds to which operating mode between the two interpretations. In doing so, by considering that a signal transmission and a D2D reception are impossible within the same band, it may operate in a manner of always applying the operating mode 2 without a separate indicator.

Further, without a separate indicator, it may be always fixed to a single operating mode. In this case, since the operating mode 1 is impossible for a very close band, it may be fixed to the operating mode 2. Alternatively, a D2D UE specifies that the interpretation 1 always applies to a combination reported as possible by the D2D UE at least, and may not report a combination capable of the operation mode 2 only as a D2D capable combination. According to such an operation, the overall operation may be simplified.

Further, the operating mode 2 applies to a signal transmission and a D2D reception within the same band, but the operation mode 1 may be automatically given to a combination of different bands supported by a UE.

D. Embodiment 4

In the following, according to another embodiment of the present invention, described is a method of making a D2D capable band combination in case that a UE can receive a multi-stream MIMO signal using a plurality of receiving antennas within a single band.

When a UE has N receiving antennas, if D2D is not configured, the corresponding UE can receive DL signal using all the receiving antennas. As a result, a maximum rank of the DL signal becomes N. On the other hand, in case that both a DL signal reception and a D2D signal reception are simultaneously configured in the corresponding UE, it is able to use K antennas among the N receiving antennas by switching the K antennas to the D2D signal reception. Through this, simultaneous receptions of DL signal and D2D signal are enabled. Yet, since the K receiving antennas are excluded from the DL signal reception, if both of the D2D signal and the DL signal are simultaneously set, a maximum rank of the DL signal becomes N-K.

Figure 14:
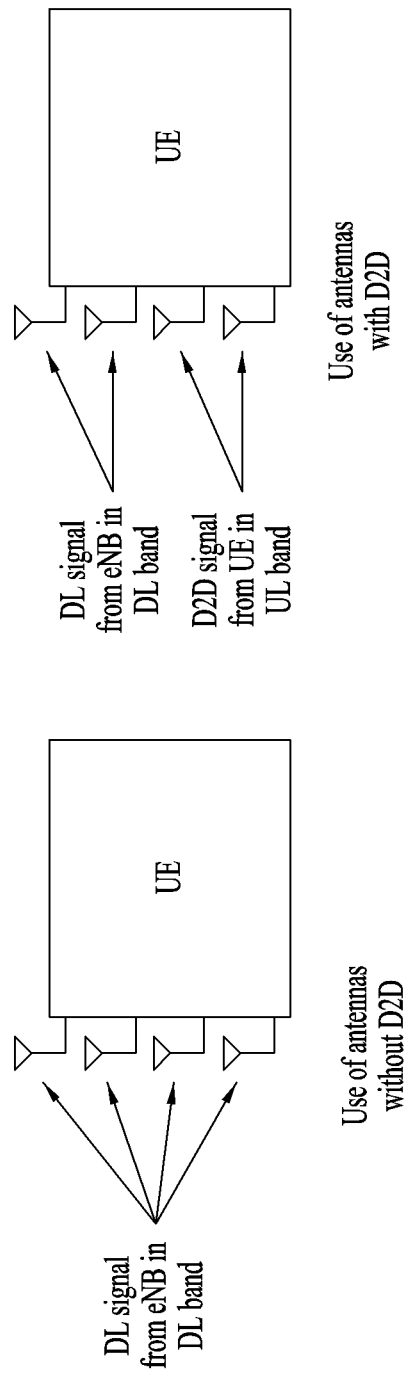
FIG. 14 is a diagram to describe a method of transceiving D2D signals in a multi-antenna supportive user equipment according to one embodiment of the present invention.

FIG. 14 is a diagram to describe a method of transceiving D2D signals in a multi-antenna supportive user equipment according to one embodiment of the present invention. In particular, FIG. 14 shows a case that some of receiving antennas are configured for a reception of a D2D signal. Referring to FIG. 14, in a situation that total 4 receiving antennas exist, if there is no D2D, a maximum rank of the DL signal is 4. On the other hand, in a situation that D2D is configured, a maximum rank of the DL signal becomes 2 by switching 2 antennas to D2D usage. If it is configured not to receive DL signal, as not shown in FIG. 14, all the receiving antennas can operate for the D2D dedicated usage. The case of being configured not to receive DL signal may correspond to a case that a DL serving cell is not configured on a band that can be processed by 4 antennas shown in FIG. 14 and a receiving circuit associated with the 4 antennas for example.

In order to support such an operation of the UE, the UE can report a DL rank maximum for a band or a band combination given in case that D2D is not configured. Hereinafter, such a rank shall be called a maximum DL rank. Furthermore, if D2D is additionally set on a specific band for the given band or the given band combination, it is able to report a maximum DL rank that is an available maximum rank. For instance, when a UE reports a band combination (Band A, Band B) and also reports a fact that a D2D reception on this combination (e.g., Band A) is possible, the UE can report a maximum DL rank supportable on each of the Band A and the Band B in case of receiving D2D on the Band A. In doing so, if the maximum DL rank on each of the bands is reported, whether D2D is configured or not can be reported to an eNB as well. Further, if the D2D is configured, it is also able to indicate the D2D configured case as well as the maximum rank. Meanwhile, it may be able to report the maximum rank for each of the cases using a different parameter.

In addition, the UE can also report a maximum D2D rank value supportable in D2D link. The eNB informs a UE, which intends to transmit a D2D signal to a specific UE, of a maximum D2D rank value of the specific UE, whereby the UE can utilize the maximum D2D rank value for a D2D signal transmission. Alternatively, the maximum D2D rank value may be directly transmitted to another UE through a D2D signal. In doing so, as mentioned in the foregoing description, the eNB operates to transmit a maximum D2D rank value in a corresponding situation depending on a presence or non-presence of DL reception.

The D2D reception of the UE can be performed in a partial time only. In case that the aforementioned report is transmitted in UL, the eNB may be interpreted as supporting a maximum rank, which corresponds to a case that D2D is not configured for the UE so far, at a timing of failing to perform the D2D actually. Or, in order to avoid a complicated operation of dynamically switching some of the antennas between DL carrier and UL CC, if D2D is configured once, although D2D is not performed at a specific timing, a maximum DL rank may be interpreted as identical to a D2D performed case.

In case that D2D is configured on each band or each band combination, a maximum DL rank may be separately reported depending on whether each band uses FDD cell or TDD cell. According to the above-described operation, a maximum DL rank on a specific band may eventually vary depending on whether D2D is configured.

Yet, if TDD cell is configured on a specific band and D2D is configured on a same band, it is exceptionally possible to operate in a manner that a maximum DL rank does not vary. The reason for this is described as follows. First of all, in case of TDD, since DL resource and UL resource appear in the same frequency carrier, although a receiving circuit is fixed to the corresponding carrier in aspect of a UE, the UE can receive both DL signal and D2D signal, which are separated by time unit. In this case, the same band may be limited to a carrier having a same center frequency additionally.

Hence, the above-described report of the UE may have an exceptional application in case of configuring TDD cell on a specific band and also configuring D2D on a same band. For instance, a maximum DL rank may not be reported separately. In this case, the same band may be limited to a carrier having a same center frequency additionally.

Yet, in case of TDD, a maximum rank may vary as well in order to reflect a change attributed to a difference of modulation scheme between DL signal and D2D signal. In doing so, if D2D is configured on each band or each band combination, a maximum DL rank may be separately reported depending on whether each band uses FDD cell or TDD cell.

E. Embodiment 5

Meanwhile, when DL CC and/or UL CC is configured on a specific band or a specific band combination, if D2D is configured on the specific band or the specific band combination, as mentioned in the foregoing description, a reception operation of the D2D may reuse an existing DL receiving circuit. Alternatively, the reception operation may be performed in a manner of establishing a separate D2D circuit.

In this case, a UE can operate according to capability for D2D reception, and is able to additionally provide additional information on UE's capability, e.g., maximum bandwidth, maximum transmission rate, etc. Alternatively, the UE omits the additional information but may apply a rule of enabling to be equal to an available value for DL reception on a same band.

In doing so, since D2D can be received in a single subframe from a plurality of UEs in case of D2D, a maximum transmission rate receivable by the UE can be interpreted in form of a sum of transmission rates of all D2D transmitting UEs, which can be processed by the corresponding UE in a specific subframe instead of a transmission rate of a single UE. For instance, if a specific UE can support a transmission rate of 100 Mbps for a D2D reception, it means that a 100-Mbps transmission of a single UE can be received in a single subframe, that a 50-Mbps transmission of each of two UEs can be simultaneously received in a single subframe, and that a 2-Mbps transmission of each of 50 UEs can be received in a single subframe. Further, the maximum transmission rate can be converted into the number of maximum transport block bits. A UE can determine the number of maximum transport block bits transmittable or receivable per subframe or for 1 TTI (transmit time interval). In this case, the number of the maximum transport block bits can be interpreted in form of a sum of the numbers of transport block bits of all D2D transmitting UEs, which can be processed by the UE in a specific subframe or 1 TTI, instead of the number of transport block bits receivable by the single UE. Likewise, a maximum transport block bit number receivable by a specific UE is 10,000, this means that a transport block bit number receivable from a single UE is 10,000 and that a total transport block bit number receivable from 5 UEs is 10,000. In case that a signal is transmitted from at least one transmitting UE, the UE can operate limitedly according to capability of the receiving UE. According to such a UE's capability, the number of D2D processes for a UE to perform D2D operation or the number of transmitting UEs can be set. In order to perform the D2D operation, if a specific UE operates according to a single transmitting UE and a single process, the number of the D2D processes corresponds to the number of UE(s) capable of perform transmission to the specific UE.

As mentioned in the foregoing description, a receiving UE can report information related to a maximum bandwidth or a maximum transmission rate available for a D2D reception with respect to UE's capability. Such a report may indicate a maximum transmission rate or a maximum bandwidth, or in some cases, may include information on the number of operations that can be performed by the UE with respect to the maximum transmission rate or the maximum bandwidth. For instance, information indicating whether a UE can receive D2D signals from how many UEs may be included. Further, in aspect of a procedure performed by the UE, information on the number of D2D processes supported by the corresponding UE may be included. In this case, the number of the D2D processes can be interpreted in form of a sum of the numbers of D2D processes for all D2D transmitting UEs instead of the number of processes for a single UE. The eNB can adjust the number of UEs simultaneously performing transmissions to the corresponding UE and a transmission rate of an individual UE based on such a report.

Figure 15:
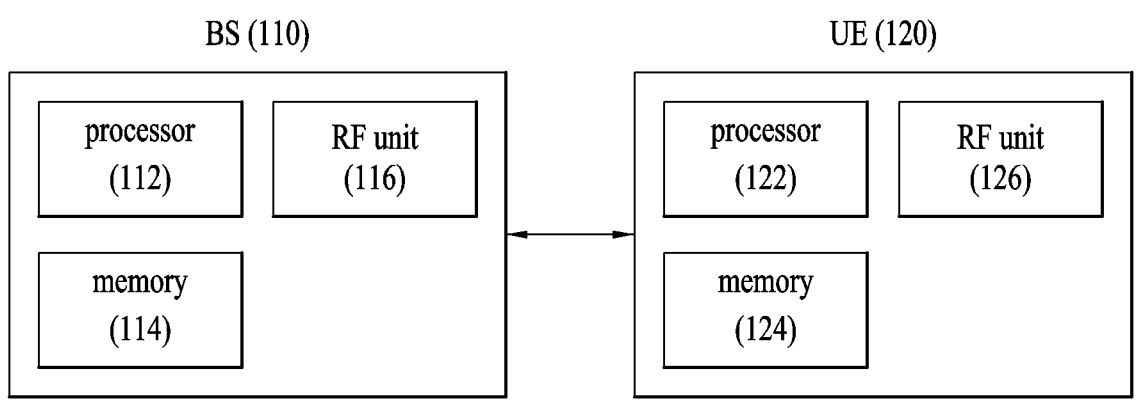
FIG. 15 is a block diagram for configuration of a transceiving device applicable to the present invention.

FIG. 15 illustrates a BS and a UE applicable to an embodiment of the present invention. In a system including a relay, the BS and the UE may be replaced with the relay.

Referring to FIG. 15, a wireless communication system includes the BS 110 and the UE 120. The BS 110 includes a processor 112, a memory 114, and a radio frequency (RF) unit 116. The processor 112 may be configured to implement the procedures and/or methods proposed by the present invention. The memory 114 is connected to the processor 112 and stores various types of information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operation of the processor 122. The RF unit 126 is connected to the processor 122 and transmits and/or receives radio signals. The BS 110 and/or the UE 120 may have a single antenna or multiple antennas.

The above-described embodiments are combinations of elements and features of the present invention in a predetermined manner Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

In the present disclosure, embodiments of the present invention are described centering on the data transmission/reception relations between a user equipment and a base station. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. The base station may be replaced with terms such as a fixed station, Node B, eNode B (eNB), and access point. Also, the user equipment may be replaced with terms such as mobile station (MS) and mobile subscriber station (MSS).

The embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be driven by a processor. The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is usable for wireless communication devices such as a user equipment, a relay, a base station and the like.

What is claimed is:

1. A method for performing a Device-to-Device (D2D) communication by a user equipment (UE) in a wireless communication system, the method comprising:
transmitting, to a base station, information on the frequency band capability, wherein the information on the frequency band capability includes first information on bands on which the UE supports simultaneous reception of a downlink signal and a D2D communication among a plurality of frequency bands for a particular band combination, and second information on bands on which the UE supports the D2D communication among the plurality of frequency bands; and
performing the D2D communication according to the information on the frequency band capability,
wherein the information on the frequency band capability further includes third information on bands on which the UE supports simultaneous transmission of an uplink signal and the D2D communication on the plurality of frequency bands for the particular band combination.

2. The method of claim 1, further comprising:
performing the D2D communication according to the information on the frequency band capability further including the third information.

3. The method of claim 1,
wherein the information on the frequency band capability further includes fourth information on bands on which a D2D transmission signal and an uplink signal are transmitted simultaneously.

4. The method of claim 3, further comprising:
performing the D2D communication according to the information on the frequency band capability further including the fourth information.

5. A method for transmitting and receiving a signal for a Device-to-Device (D2D) communication by a base station in a wireless communication system, the method comprising:
receiving information on frequency band capability from a user equipment (UE), wherein the information on the frequency band capability includes first information on bands on which a the UE supports simultaneous reception of a downlink signal and a D2D communication among a plurality of frequency bands for a particular band combination, and second information on bands on which the UE supports the D2D communication among the plurality of frequency bands;
determining whether the UE performs the D2D communication on the plurality of frequency bands based on the information on the frequency band capability; and
scheduling the D2D communication for a specific frequency band in the plurality of frequency bands based on the determination,
wherein the information on the frequency band capability further includes third information on bands on which the UE supports simultaneous transmission of an uplink signal and the D2D communication on the plurality of frequency bands for the particular band combination.

6. The method of claim 5, further comprising:
determining whether the UE performs the D2D communication on the plurality of frequency bands based on the information on the frequency band capability further including the third information; and
scheduling the D2D communication for a specific frequency band in the plurality of frequency bands based on the determination based on the information on the frequency band capability further including the third information.

7. The method of claim 5,
wherein the information on the frequency band capability further includes fourth information on bands on which a D2D transmission signal and an uplink signal are transmitted simultaneously by the user equipment.

8. The method of claim 7, further comprising:
- determining whether the UE performs the D2D communication on the plurality of frequency bands based on the information on the frequency band capability further including the fourth information; and
- scheduling the D2D communication for a specific frequency band in the plurality of frequency bands based on the determination based on the information on the frequency band capability further including the fourth information.

9. A user equipment (UE) for performing a Device-to-Device (D2D) communication in a wireless communication system, the user equipment comprising:
- a transceiver coupled to a processor; and
- the processor configured to:
  - transmit, to a base station, information on the frequency band capability, wherein the information on the frequency band capability includes first information on bands on which the UE supports simultaneous reception of a downlink signal and a D2D communication among a plurality of frequency bands for a particular band combination, and second information on bands on which the UE supports the D2D communication among the plurality of frequency bands; and
  - perform the D2D communication according to the information on the frequency band capability,
- wherein the information on the frequency band capability further includes third information on bands on which the UE supports simultaneous transmission of an uplink signal and the D2D communication on the plurality of frequency bands for the particular band combination.

10. The method of claim 9,
wherein the processor is further configured to:
perform the D2D communication according to the information on the frequency band capability further including the third information.

11. The user equipment of claim 9,
wherein the information on the frequency band capability further includes fourth information on bands on which a D2D transmission signal and an uplink signal are transmitted simultaneously.

12. The user equipment of claim 11,
wherein the processor is further configured to:
perform the D2D communication according to the information on the frequency band capability further including the fourth information.

13. A base station for transmitting and receiving a signal for a Device-to-Device (D2D) communication in a wireless communication system, the base station comprising:
- a transceiver coupled to a processor; and
- the processor configured to:
  - receive information on frequency band capability from a user equipment (UE), wherein the information on the frequency band capability includes first information on bands on which the UE supports simultaneous reception of a downlink signal and a D2D communication among a plurality of frequency bands for a particular band combination, and second information on bands on which the UE supports the D2D communication among the plurality of frequency bands;
  - determine whether the UE performs the D2D communication on the plurality of frequency bands based on the information on the frequency band capability; and
  - schedule the D2D communication for a specific frequency band in the plurality of frequency bands based on the determination,
- wherein the information on the frequency band capability further includes third information on bands on which the UE supports simultaneous transmission of an uplink signal and the D2D communication on the plurality of frequency bands for the particular band combination.

14. The base station of claim 13,
wherein the processor is further configured to:
- determine whether the UE performs the D2D communication on the plurality of frequency bands based on the information on the frequency band capability further including the third information; and
- schedule the D2D communication for a specific frequency band in the plurality of frequency bands based on the determination based on the information on the frequency band capability further including the third information.

15. The base station of claim 13,
wherein the information on the frequency band capability further includes fourth information on bands on which a D2D transmission signal and an uplink signal are transmitted simultaneously by the user equipment.

16. The base station of claim 15,
wherein the processor is further configured to:
- determine whether the UE performs the D2D communication on the plurality of frequency bands based on the information on the frequency band capability further including the fourth information; and
- schedule the D2D communication for a specific frequency band in the plurality of frequency bands based on the determination based on the information on the frequency band capability further including the fourth information.

\* \* \* \* \*